(12) United States Patent
Winkler

(10) Patent No.: US 6,915,904 B2
(45) Date of Patent: Jul. 12, 2005

(54) LAYER TRAY

(75) Inventor: Walter Winkler, Parkstein (DE)

(73) Assignee: Witron Logistik + Informatik GmbH, Parkstein (DE)

( * ) Notice: Subject to any disclaimer, the term of this patent is extended or adjusted under 35 U.S.C. 154(b) by 207 days.

(21) Appl. No.: 10/308,063

(22) Filed: Dec. 2, 2002

(65) Prior Publication Data

US 2004/0007492 A1 Jan. 15, 2004

(30) Foreign Application Priority Data

Jul. 15, 2002 (DE) ..................................... 202 11 591 U

(51) Int. Cl.[7] .............................................. B65D 1/34
(52) U.S. Cl. ..................................... 206/559; 206/557
(58) Field of Search ........................... 108/51.11, 52.1; 206/386, 556, 557, 559, 561; 312/330.1, 348.3, 350

(56) References Cited

U.S. PATENT DOCUMENTS

| | | | | |
|---|---|---|---|---|
| 1,541,173 A | * | 6/1925 | Ormond | ..................... 220/536 |
| 1,678,357 A | * | 7/1928 | Sampson, Sr. | ................. 402/2 |
| 2,110,299 A | * | 3/1938 | Hinkle | ...................... 211/59.3 |
| 2,619,233 A | * | 11/1952 | Weiskopf | ................. 211/41.13 |
| 2,954,128 A | * | 9/1960 | Gordon | ..................... 211/59.3 |
| 4,907,707 A | * | 3/1990 | Crum | ......................... 211/59.3 |
| 6,378,702 B1 | * | 4/2002 | Kintzig | ....................... 206/456 |

* cited by examiner

Primary Examiner—John A. Ricci
(74) Attorney, Agent, or Firm—DLA Piper Rudnick Gray Cary US LLP

(57) ABSTRACT

A tray for use in order-picking system is presented. The tray includes a base part on which order-picking articles (for example retail articles) can be stored, a frame which is attached to the base parts, and a sliding part for displacing the order-picking articles in the direction of a removal position of the order-picking articles. It is thus possible to perform the picking operation of one of the articles in an economically-favorable posture irrespective of how full or empty the trays.

15 Claims, 10 Drawing Sheets

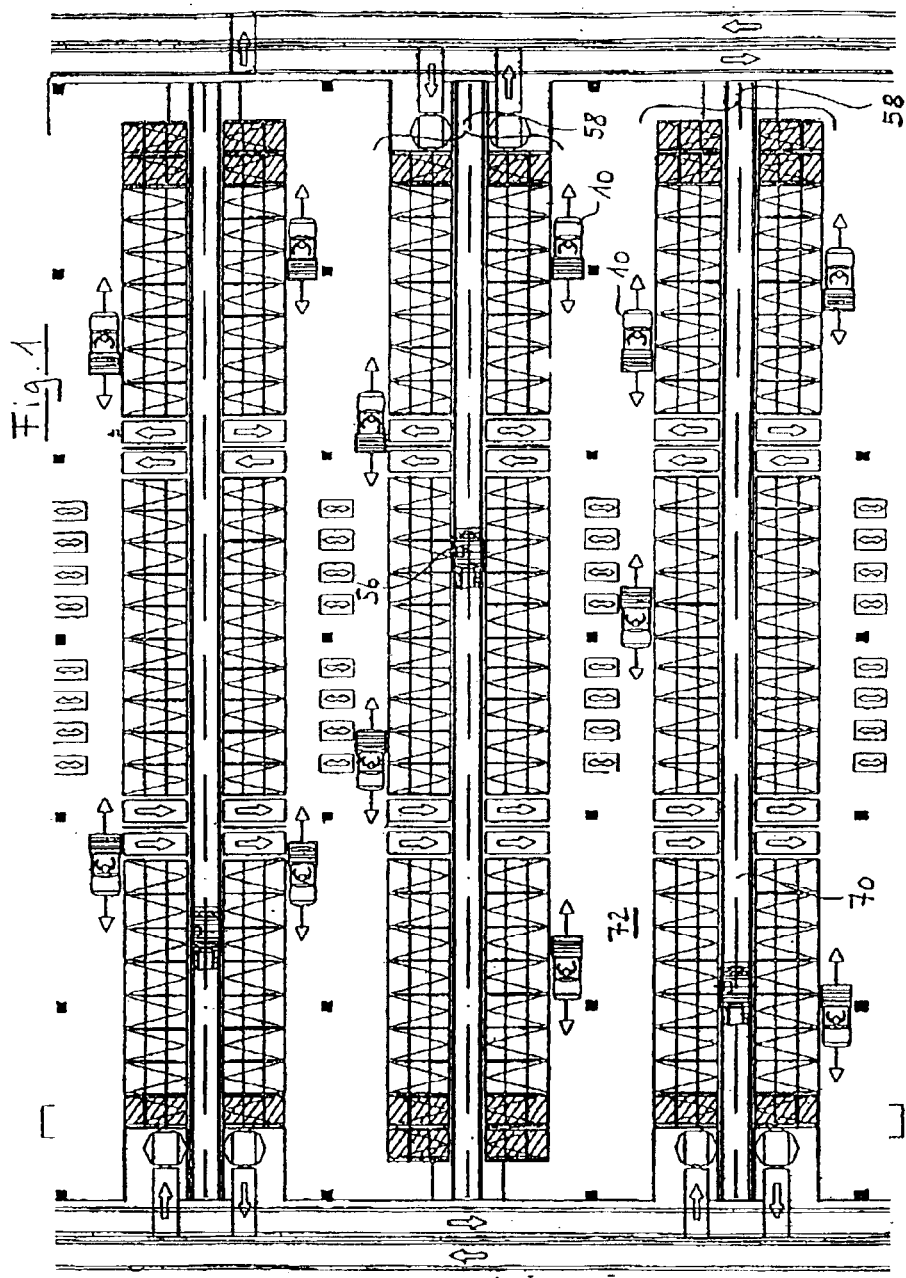

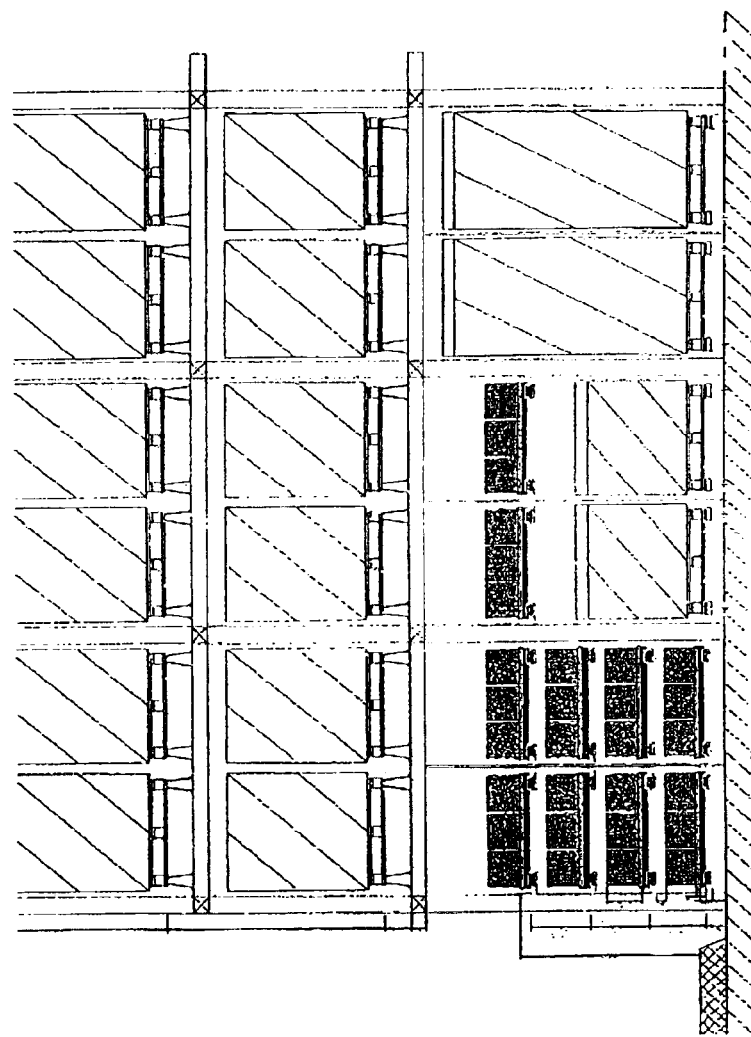
Fig. 2 (State of the art)

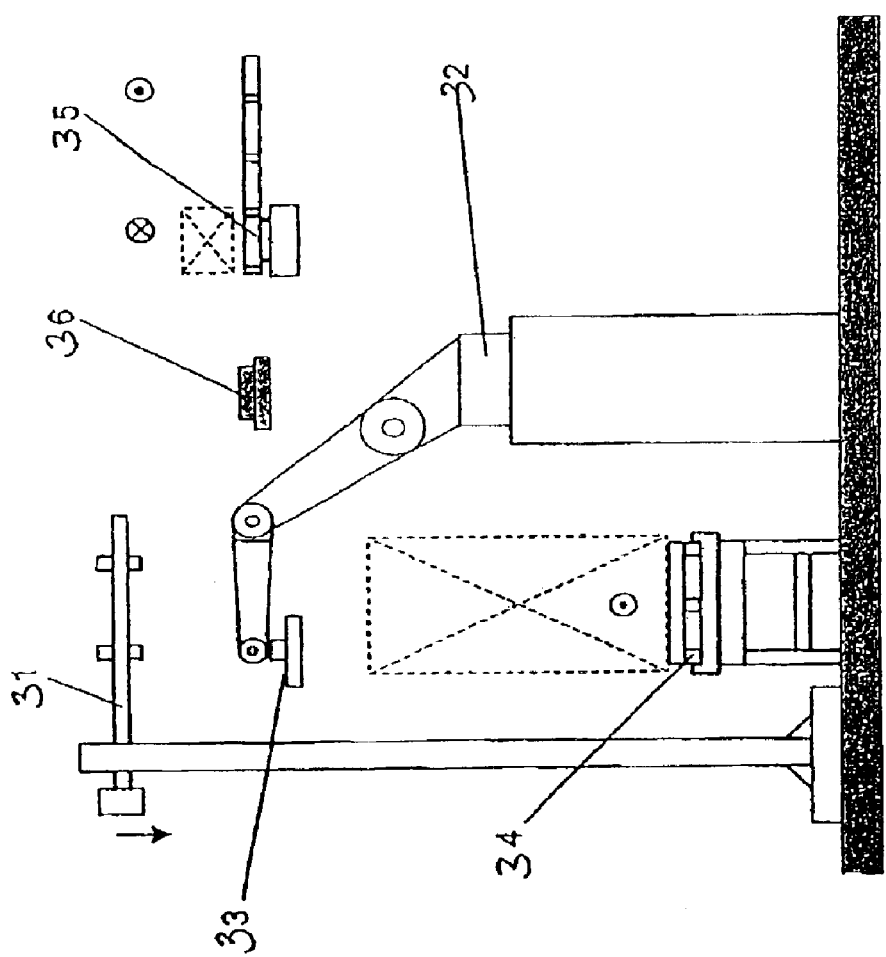
Fig. 3 (State of the art)

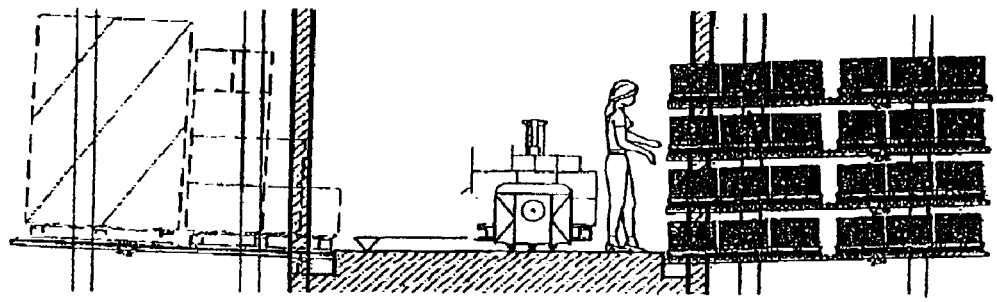
Fig. 4  (State of the art)
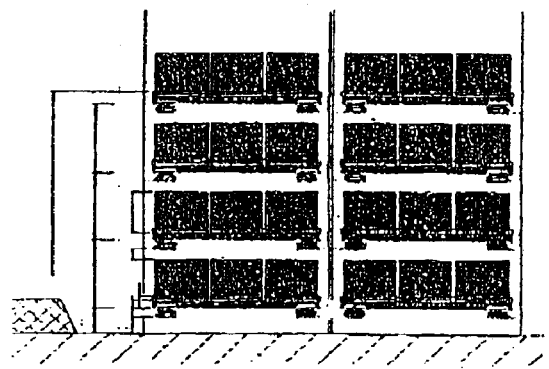
Fig. 5  (State of the art)

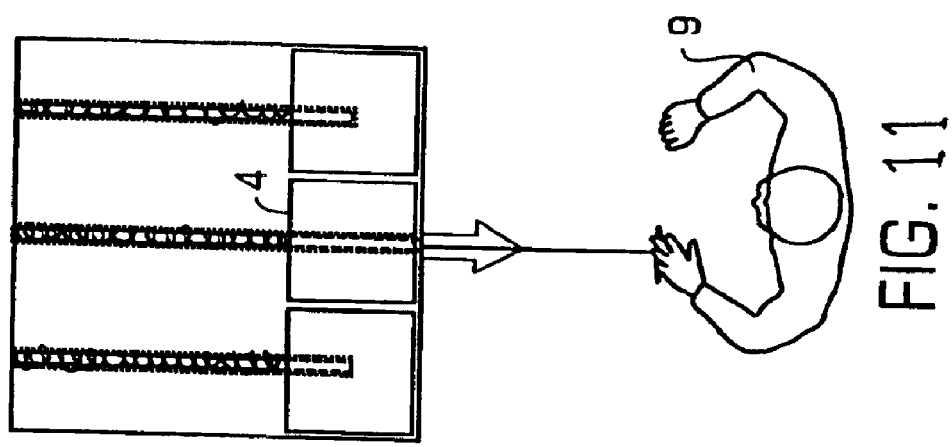

LAYER TRAY

The present invention relates to a tray (a so-called layer tray) for use in an order-picking system.

In an order-picking system according to the prior art, such as is described, for example, in European Patent Application EP 1 101 540, articles which are to be order-picked are stored in storage racks on removal pallets or in special containers, for example small-load-carriers—referred to below as "SLCs". The order-pickers—also called "pickers" below—remove the articles to be order-picked from that point in order to carry out their order-picking instruction.

The order-picking system initially mentioned is shown in FIG. 1 and consists, for example, of a plurality of parallel rows of racks 58 for storing and buffering units, such as pallets, SLCs or containers for instance, for receiving the articles to be order-picked. Storing lanes 70 and picking lanes 72 may be formed alternately between the rows of racks. The said rows of racks 58 may be supplied, via the storing lanes 70 with units which are to be stored and buffered. The removal of the articles to be order-picked takes place from the picking lanes 72. Located in each storing lane 70 is at least one storing vehicle 56 which is capable of travelling along the lane. The picking lane 72 has at least one picker vehicle 10 for picking the articles to be order-picked, the said picker vehicle 10 being capable of travelling along the lane. The vehicles are also referred to generally as rack vehicles (also "RVs").

FIG. 2 shows, diagrammatically, a front view of part of a rack front in FIG. 1. Three planes are represented in the x direction, and three columns in the y direction. Illustrated in each of the upper two planes are articles which are to be order-picked and which are stored on pallet units. In the rack column situated furthest to the left, so-called layer trays are stored in the lowest plane of the rack front. A layer tray is understood to mean a kind of server or tray on which goods, which are packed in packages, are stored. A package is understood to mean a grippable unit (or, as the case may be, the article) which is to be order-picked or picked, such as, for example, a five-pack of disposal lighters. A grippable unit may consist of a number of articles which have been packaged to form a unit. Only one pallet-layer (layer) of units at a time is located in or on the individual trays, and may be made up of a number of rows of packages.

In the order-picking systems according to the prior art, it is quite normal for articles, which are delivered to the system on pallets which have been packed in layers, to be depalletised, that is to say, the articles are re-packed from the pallet to the tray in layers—either automatically or manually. The articles which have been repacked on trays are then stored in the storage racks, for example by storing vehicles.

FIG. 3 shows an (automated) depalletising station, such as is disclosed, for example, in German Utility Model No. 202 03 287 which has been applied for. The automated depalletising station according to FIG. 3 consists of a camera system 31, a robotic cell 32 with a gripper 33 and pallet-conveying technics 34 and (container-) conveying technics 35. The camera system 31 comprises a line camera which is required for scanning the pallet location. The camera system 31 takes a picture of the uppermost layer of the pallet, which has been packed with articles in a stratified manner, in order to evaluate, by means of a computer, the picture which has been taken, under which circumstances the location of the articles in the uppermost layer on the pallet is ascertained. This information is passed on to a control system (not represented) which gives instructions, on the basis of this data, to the robotic cell 32, in particular the gripper 33 of the robot 32, as to where the individual articles are located on the pallet and how they are to be picked up by the gripper 33 in order to be repacked directly in or on an empty layer tray which is provided on the conveying technics 35 at the repacking point.

Under these circumstances, the pallet-conveying technics 34 are required for transporting the pallets in and away. On the conveyor technics 35, empty containers, smaller pallets or layer trays are supplied (depending upon the requirements of the system), and transported away again, packed full with units, after the repacking operation. The articles are optionally arranged on an intermediate repository 36, in order to buffer the unit waiting on the conveying technics 35.

In the lower rack storage place which is situated furthest to the left in FIG. 2, two layer trays at a time are stored side by side in four rows, one above the other. In the central column of the rack in FIG. 2, two layer trays are placed in storage side by side in the lowest plane via two pallet units disposed side by side. In the right-hand column of the rack, two pallet units, on which, for example, containers are stored, are located on the lower plane.

FIG. 4 shows a section along a y-z plane of an order-picking system which corresponds to that in FIG. 1. In the centre of the figure, a picking lane is shown which is enclosed by two rows of storage racks which extend in the x direction (not represented). In the row of racks represented on the right, there can be seen a total of eight layer trays which are each loaded with three rows of packages, each containing three packages.

FIG. 5 shows a view of the y-x plane, of the row of racks represented on the right in FIG. 4.

Also shown in FIG. 4, in the picking lane, is an order-picker with her picking vehicle, who is removing the packages from the layer trays in order so put them on her picking vehicle. The layer trays are stored on so-called gravity roller tracks. The said gravity roller track is lowered in the direction of the picking lane. If one of the layer trays is cleared to the point of being empty, it can be removed from the rack by the picker. The next full layer tray rolls in the direction of the picking lane as a result of gravity.

Since the intention is to store as many articles as possible in the storage racks, the articles, or the units on which they are located, are closely packed in terms of space. As can easily be perceived from FIG. 4, the picker is only able, because of the spatial narrowness, to pick packages out of the foremost row of packages. Furthermore, the order-picker often cannot reach far enough into the rack to pick the next row of packages. Even if it is still possible to pick the next row of packages, this can nevertheless be done only in a picking posture which is ergonomically unfavourable.

An object of the present invention is therefore to provide a layer tray which permits an ergonomic picking posture on the part of the order-picker for all the packages located on the tray.

This object is achieved by the layer tray according to the invention, which has a base part on which the order-picking articles can be stored, a frame which is attached to the said base, and a sliding means for sliding the said order-picking articles in the direction of a removal position.

According to a preferred embodiment, the sliding means is a slide which is guided in the base part by means of a groove.

According to another embodiment, the sliding means is a slide which is guided in the frame by means of a groove.

According to another embodiment, the frame and/or the base part has a clearance through which there engages a handle, which is connected to the sliding means, for moving the slide.

According to a further embodiment, the base part is lowered in relation to the frame in such a way that, if two trays are stacked one above the other, the base part of the upper tray is enclosed by the frame of the lower tray.

According to another embodiment, the base part is constructed in one piece with the frame.

According to another embodiment, the height of a slide of the sliding means is smaller than, or equal to, the height of the base part.

According to another embodiment, the slide has a joint so that the said slide can be folded on the base.

According to another embodiment, the frame can be attached to the base part, in particular slipped onto the latter; the slide connected to a handle has a joint so that the said slide can be folded onto the base part; and the slide has a spring so that the said slide does not jump out of the guide groove when in the pulled-out condition.

According to another embodiment, the size of the storage surface on which the articles can be stored is equal to the storage surface of the pallets and/or small-load-carriers used in the order-picking system.

According to another embodiment, the base part has an elevation or depression, by means of which the tray can be transported with the aid of a load-lifting member of a rack vehicle or stacker vehicle.

According to another embodiment, the tray has a tensioning spring which pretensions the sliding means in relation to the tray in the direction of the removal position, a holding element for holding the pretensioned sliding means, and also a triggering apparatus for releasing the said holding element. In another embodiment, the frame consists of a number of elements and each element is connected to the base part via at least one joint so that the elements of the frame can be folded onto the base part.

One advantage of the invention is that picking is facilitated and is possible from an ergonomically favourable picking position, since an order-picker is able to pull the goods to be order-picked towards him via the sliding means, so that he no longer has to reach into the full depth of the tray in order to be able to remove all the articles located on the said tray. In addition, the picking capacity can be increased by means of the invention.

Another advantage of the tray according to the invention is that it can be stacked.

BRIEF DESCRIPTION OF THE DRAWINGS

Other objects, advantages and features of the present invention will become clear from the description which now follows, viewed in conjunction with the accompanying drawings, in which:

FIG. 1 shows an order-picking system according to the prior art in top view;

FIG. 2 shows a front view of a storage rack of the order-picking system according to FIG. 1;

FIG. 3 shows a fully automatic depalletising station according to the prior art;

FIG. 4 shows a diagrammatic cross-section along the y-z plane of the order-picking system according to FIG. 1;

FIG. 5 shows a diagrammatic cross-section along the y-z plane of the order-picking system according to FIG. 1;

FIG. 11 shows an exemplary embodiment of the invention including a pretensioned spring.

DETAILED DESCRIPTION OF THE INVENTION

Figure 6:
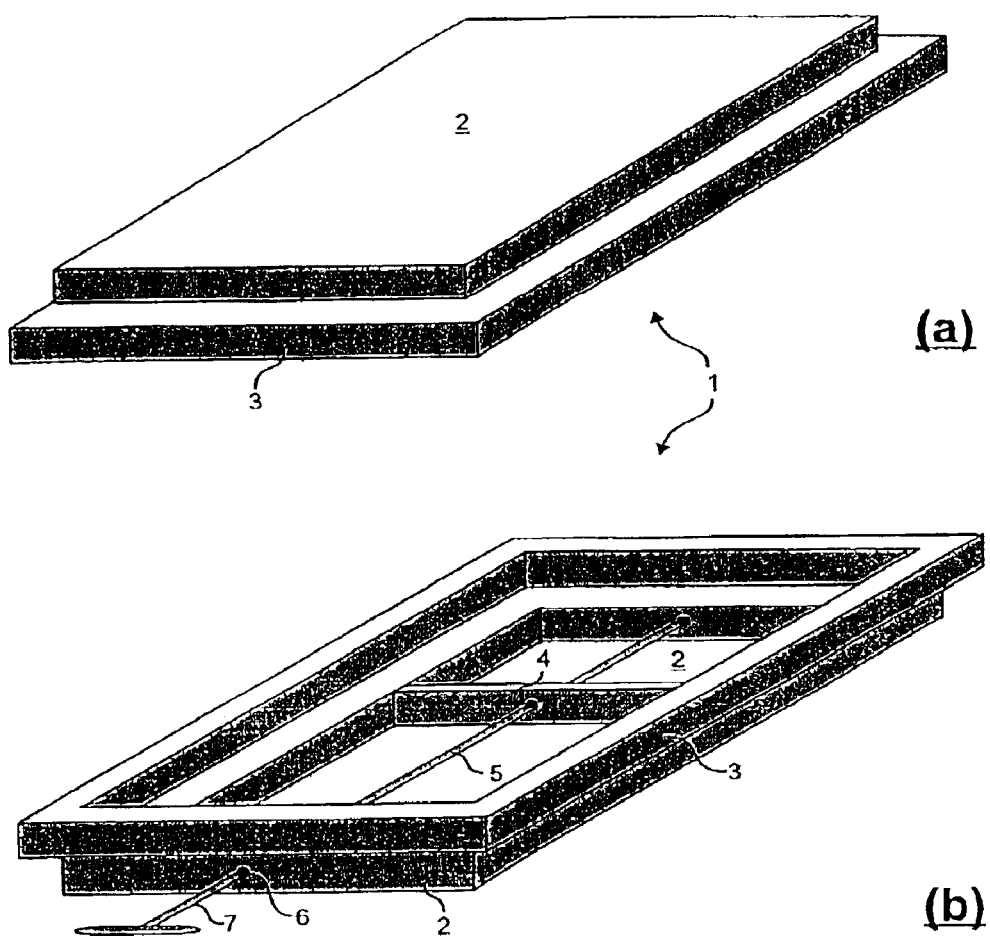
FIGS. 6a and 6b show a perspective view onto and below a layer tray according to the invention.
Figure 7:
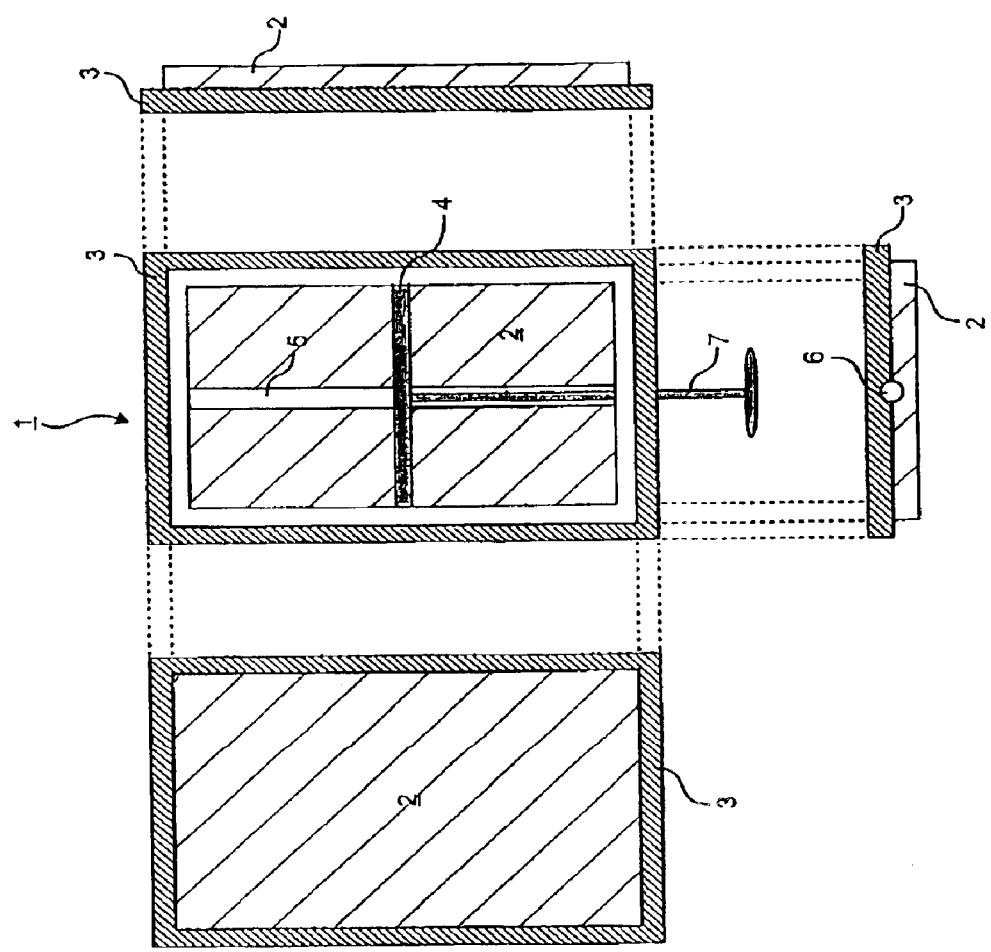
FIG. 7 shows two-dimensional views of the tray in FIG. 6.

A first embodiment according to the present invention is shown in FIGS. 6 and 7. FIG. 6 shows a perspective view from above, and one from below, of the layer tray or tray according to the invention. FIG. 7 shows a view from below, a top view and the corresponding side views of the said layer tray.

A perspective view of the layer tray 1 according to the invention is represented in FIG. 6b. The said layer tray 1 comprises a base 2 on which a frame 3 can be seated The said base 2 and frame 3 may also be of one-piece construction. A groove 5, in which a slide 4 is guided, is let into the base 2, parallel to the longitudinal side. The said slide 4 is connected to a handle 7. The said handle 7 may protrude through an aperture or clearance 6 in the base 2 and/or frame 3 of the layer tray 1.

In FIG. 6a, the said layer tray 1 can be seen in a perspective view from below. It can be perceived that the trough-shaped base part 2 is surrounded by the frame 3. In a preferred embodiment, the height of the frame 3 is equal to the thickness of the base 2. Furthermore, the outer periphery of the base part 2 approximately corresponds to the inner periphery of the frame part 3, so that a number of layer trays can be stacked in or on one another. Under these circumstances, the height of the slide 4 is selected in such a way that the latter does not protrude beyond the height of the base 2.

In FIG. 7, a top view of the layer tray 1 according to the invention is once again shown in the centre. The corresponding profiles are shown on the right and underneath it in each case. A top view of the underside of the layer tray 1 is shown on the left. In FIGS. 6 and 7 and all the succeeding figures, the same reference symbols denote the same elements of the invention.

Figure 8:
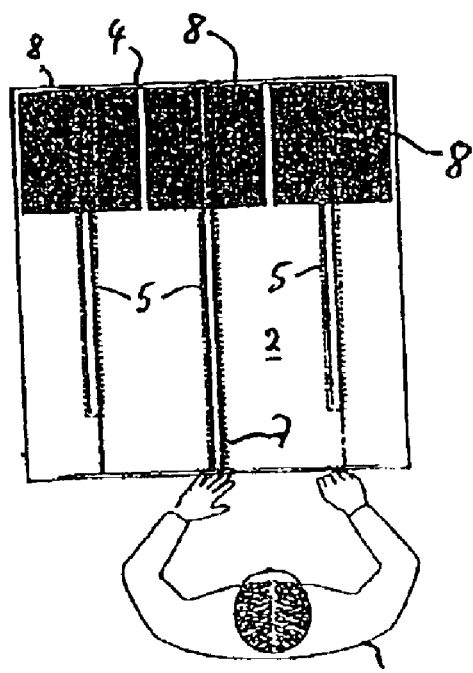
FIG. 8 shows the removal of packages from a tray according to the invention.
Figure 8:
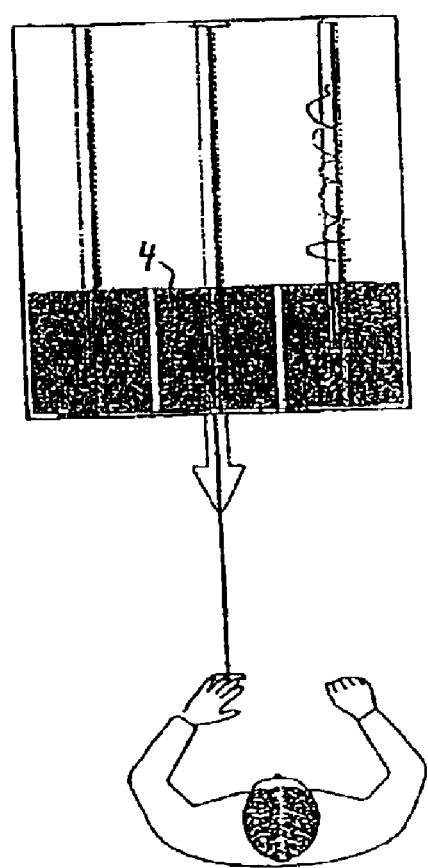

FIGS. 8a and 8b show a top view of the layer tray 1 according to the invention, when used in an order-picking system. In the exemplified embodiment represented in FIG. 8, three grooves 5, which serve to guide the slide 4, are let into the base. Three packages 8, which are located in the rear part of the layer tray, are represented in FIG. 8a. An order-picker 9 has already picked the two rows of packages which are at the front, viewed from his position. However, the order-picker 9 is either unable to reach the packages 8 stored at the rear of the layer tray at all, or is able to do so only with considerable effort, particularly if a number of layer trays are disposed one above another in a rack, as has already been illustrated in FIG. 4.

In order to be able to pick the remaining packages 8 located on the layer tray more successfully, and to assume an ergonomically favourable picking posture, the order-picker 9 actuates the slide 4 by pulling the latter towards him by means of the handle 7 connected to the said slide 4. This operation is represented diagrammatically in FIG. 8b and is clarified by the downwardly pointing arrow. The packages 8 are pulled towards the front as a result of actuation of the slide 4. The order-picker 9 can then push back the slide 4 towards the rear again into its original position, and pick the packages 8 from the picking position which is favourable for him. According to a preferred embodiment, the handle 7 is attached to the slide 4 in such a way that it lies (almost) completely in the groove 5 when the slide 4 is located in the original condition. The aperture 6 represented in FIG. 6 is then located in the base part 2. It is thus possible to guarantee that a number of (empty) layer trays can be stacked one above another.

Figure 9:
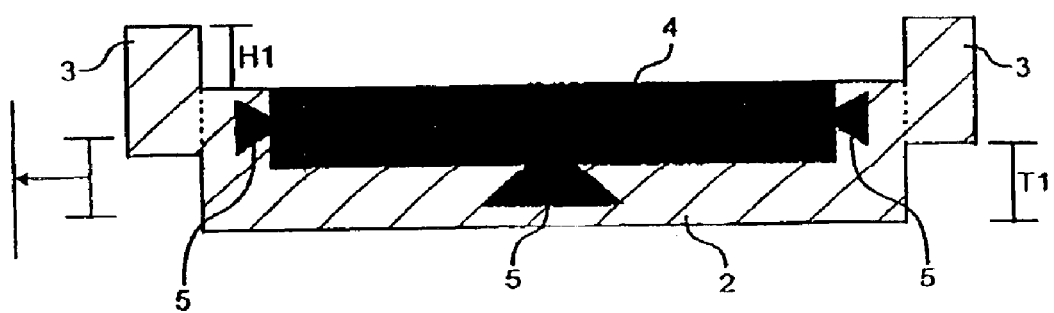
FIG. 9 shows a sectional view along the line I—I in FIG. 7.

FIG. 9 shows a cross-section along the line I—I in FIG. 7. The section along the line I—I is selected in such a way that the slide 4 is located in this sectional plane. The slide 4 which, in this example, is of substantially right-angled construction, has a projection on the underside, so that the said slide 4 is held and guided in the groove via the said projection.

It can also be perceived, in FIG. 9, chat the cross-section of the layer tray according to the invention is selected in such a way that the base part 2 fits into the frame 3 when a number of layer trays are stacked one above another. In this case, the height of the slide 4 is selected in such a way that it does not protrude above the height of the base part 2, as a result of which stackability of the layer tray is guaranteed. However, it is not absolutely necessary for the height of the slide 4 to be equal to the height of the base part 2. The height of the slide may also protrude above the height of the base 2. It may also be higher thaw the combination of the heights of the base part and frame. In that case, however, a joint should be provided between the slide 4 and its protection, so that the said slide 4 can be folded over onto the base in the condition in which the trays are stacked one on top of the other. Furthermore, the thickness $T_1$ of the base 2 does not have to be equal to the height $H_1$ of the frame 3. Any desired heights are possible for the base part and frame. In the condition in which the trays are stacked one above the other, however, the frame 3 should enclose the base of the layer tray stacked above it. The size of these dimensions is such that a number of layer trays can be stacked one above another in a stable manner.

Figure 10:
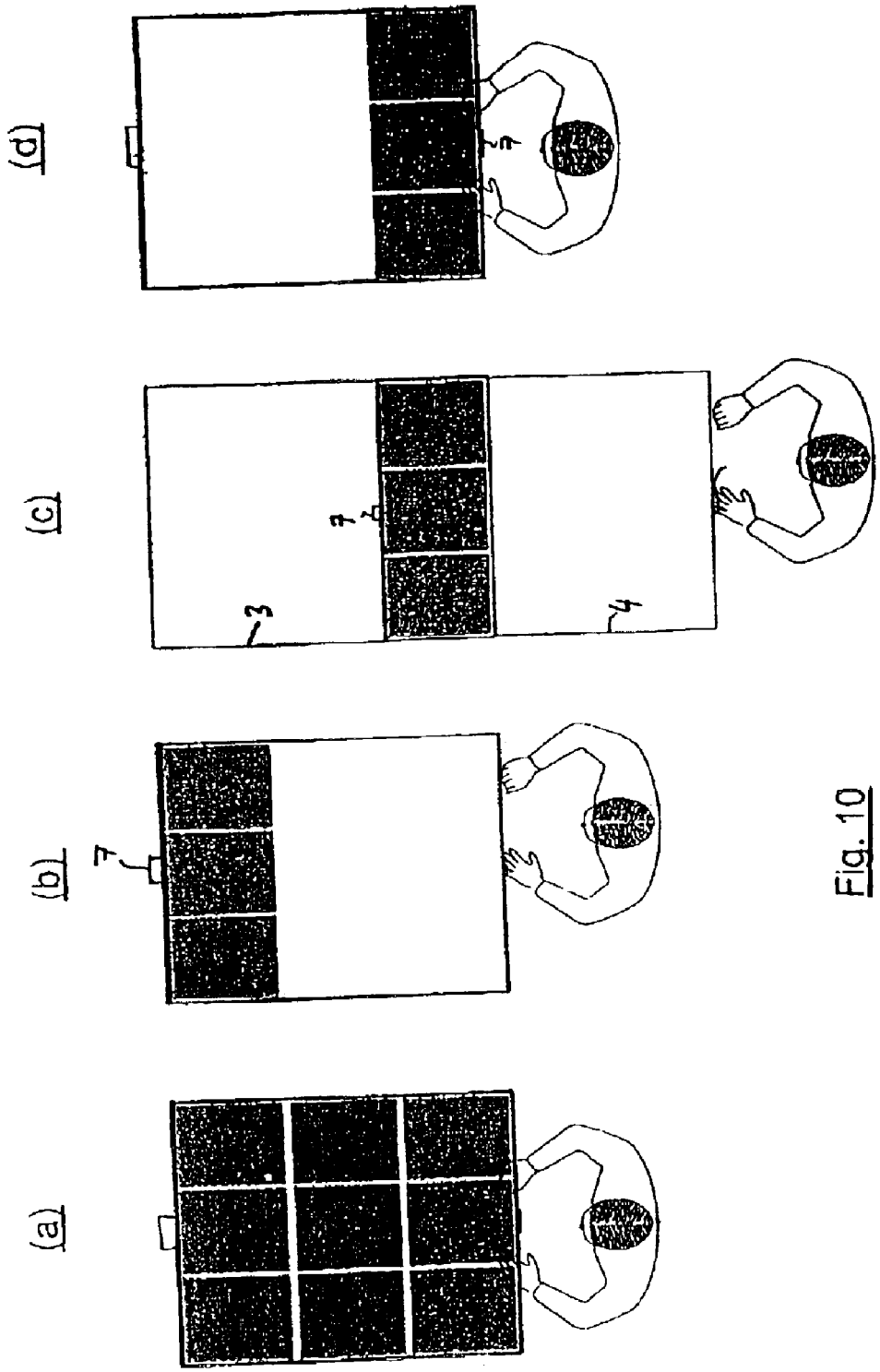
FIG. 10 shows another exemplified embodiment of the invention.

A top view of another embodiment of the invention is represented in FIG. 10. In the layer tray in FIG. 10, the sliding means 4 is connected to the frame 3 or the base 2 by means of a groove and a corresponding projection (tongue) on the said frame 3. This is illustrated diagrammatically in FIG. 9 by the projections 5 situated to the left and right of the slide 4. The "groove" and the projection or "tongue" may be of similar construction to those in FIG. 9. In principle, however, cross-sectional shapes other than the trapezoidal shape are also possible, so long as the tongue is held in the groove and the slide 4 can be displaced along the said groove 5.

In FIG. 10a, the layer tray is fully loaded with packages. In FIG. 10b, the picker has already removed the two rows of packages situated at the front from the layer tray. Without considerable effort, however, the picker is not able to get to the last three packages in order to remove them. The picker therefore pulls on the handle 7 which is connected to the slide 4, and thus pulls the slide 4 towards him, for example by moving a few steps backwards (FIG. 10c). In FIG. 10d, the picker has pushed the slide 4 back into its original position again. The packages which have been conveyed towards the front can now be removed by the picker without difficulty. This takes place in an ergonomically favourable posture, which constitutes a major advantage of the invention.

In the variant of the invention which is represented in FIG. 10 and in which the slide is guided in the frame, a further handle may be fastened to the slide 4 on the opposite side from the picker. The said slide 4 can then be actuated both from the front and also from the rear, so that the orientation of the layer tray in the storage rack, such as is represented, for example, in FIG. 4, is unimportant. The slide 4 can then also be pulled out towards the rear. An arresting arrangement is preferably provided in the central position. Along the tongue which is held in the groove 5, the slide 4 preferably has stop devices which prevent the possibility of the said slide 4 being pulled out of the frame 3. The sliding means 4 may also be guided by a combination of grooves in the frame and in the base.

It is also possible to keep the packages which are located on the tray under permanent pretensioning in the direction of the removal position by means of a spring.

According to another embodiment of the invention illustrated in FIG. 11. the slide 4 may be connected to the layer tray via a tensioning spring. In this case, the handle 7 is dispensed with. The tension spring is pretensioned in the direction of the removal point when the slide is located in its original condition. The tensioning spring is additionally connected to a triggering apparatus which can be actuated by the picker in order to relieve the tensioning spring of tension. When the triggering device is actuated, the tensioning spring expands and thus forces the slide 4 in the direction of the removal point. Under these circumstances, the strength of the tensioning spring must be selected in such a way that the force exerted by the latter is sufficient to move articles which are stored on the layer tray.

In the example in FIG. 11, this would mean that the tensioning spring is attached between the slide 4 and the rear edge of the frame 3 or base 2. The said tensioning spring is preferably located in the groove 5.

According to another embodiment of the invention, the frame 3 is not, as previously described, constructed in one piece with the base part 2, but instead may also be constructed in such a way that it can either be slipped onto the said base part 2 or folded away from/towards the base. In the case of the foldable variant, joints are provided in each case between the base part 2 and the frame 3, which may possibly consist of a number of elements, so that the said frame 3 can be folded onto the base. As a result, layer trays with an elevated frame can likewise be stacked in a space-saving manner. Furthermore, elevations or depressions may be provided on the opposite side of the base from the storage surface of the latter, as a result of which the layer tray can be transported with the aid of a so-called load-lifting member such as, for example, a telescopic fork of a rack vehicle such as, for example, a forklift truck, through the fact that the said fork is inserted in corresponding depressions in the base 2.

It should once again be emphasised that one advantage of the invention is that a picker is always able to perform picking in an ergonomically favourable posture, irrespective of how "full" or "empty" the tray is.

What is claimed is:

1. A tray for use in order-picking system, the tray comprising:
   a base part on which order-picking articles can be stored,
   a frame which is attached to the base part, and
   a sliding means for displacing the order-picking articles in the direction of a removal position for the said order-picking articles, wherein the sliding means has a slide which is guided in the frame by means of at least one groove.

2. The tray according to claim 1 further comprising a trough-shaped section in the base part, wherein the trough-shaped section is lowered in relation to the frame in such a way that, if two trays are stacked one above the other, the base part of the upper tray is enclosed by the frame of the lower tray.

3. The tray according to claim 1, wherein the base part is constructed in one piece with the frame.

4. The tray according to claim 3, wherein the slide of the sliding means does not protrude upwards above the base part.

5. The tray according to claim 1, wherein the size of the storage surface on which the articles can be stored is equal to the size of the storage surface of pallets and/or small-load-carriers used in the order-picking system.

6. The tray according to claim 1, wherein the base part has an elevation or depression, by means of which the tray can be transported with the aid of a load-lifting member of a rack vehicle or stacker vehicle.

7. The tray according to claim 1, having a tension spring which pretensions the sliding means in relation to the frame in the direction of the removal position.

8. The tray according to claim 7, the tray having a holding element for positioning the pretensioned sliding means.

9. A tray for use in order-picking system, the tray comprising:

a base part on which order-picking articles can be stored, a frame which is attached to the base part, and a sliding means for displacing the order-picking articles in the direction of a removal position for the order-picking articles wherein the sliding means has a slide which is guided in the base cart by means of at least one groove;

wherein the frame and/or the base part has a clearance through which there engages a handle, which is connected to the sliding means, for moving the slide.

10. The tray according to claim 9 further comprising a trough-shaped section in the base part, wherein the trough-shaped section is lowered in relation to the frame in such a way that, if two trays are stacked one above the other, the base part of the upper tray is enclosed by the frame of the lower tray.

11. The according to claim 9, wherein the base part is constructed in one piece with the frame.

12. The tray according to claim 11, wherein the slide of the sliding means does not protrude upwards above the base part.

13. The tray according claim 9, wherein the size of the storage surface on which the articles can be stored is equal to the size of the storage surface of the pallets and/or small-load-carriers used in the order-picking system.

14. The tray according to claim 9, wherein the base part has an elevation or depression, by means of which the tray can be transported with the aid of a load-lifting member of a rack vehicle or stacker vehicle.

15. The tray according to claim 9 further comprising a holding element for holding and positioning the sliding means.

* * * * *